J. J. MERRILL.
ICE CUTTING MACHINE.
APPLICATION FILED DEC. 21, 1906.

902,503.

Patented Oct. 27, 1908.
3 SHEETS—SHEET 1.

Witnesses:
H. B. Davis.
H. A. Boyle.

Inventor:
John J. Merrill
by Noyes & Hannan
attys

J. J. MERRILL.
ICE CUTTING MACHINE.
APPLICATION FILED DEC. 21, 1906.

902,503.

Patented Oct. 27, 1908.
3 SHEETS—SHEET 3.

Witnesses:
H. B. Davis.
H. A. Boyle.

Inventor:
John J. Merrill

UNITED STATES PATENT OFFICE.

JOHN J. MERRILL, OF NEWBURYPORT, MASSACHUSETTS, ASSIGNOR OF ONE-HALF TO BENJAMIN PEARSON, OF BYFIELD, MASSACHUSETTS, AND WILLIAM F. RUNNELLS, OF NEWBURYPORT, MASSACHUSETTS.

ICE-CUTTING MACHINE.

No. 902,503.     Specification of Letters Patent.     Patented Oct. 27, 1908.

Application filed December 21, 1906. Serial No. 348,862.

*To all whom it may concern:*

Be it known that I, JOHN J. MERRILL, of Newburyport, county of Essex, State of Massachusetts, have invented an Improvement in Ice-Cutting Machines, of which the following description, in connection with the accompanying drawings, is a specification, like characters on the drawings representing like parts.

This invention relates to a machine for forming a series of parallel cuts in a field of ice, so that the ice may be secured in rectangular cakes, as is customary. In performing this work it has been customary to cut only part way through the ice, the cakes then being split off from the field with a chisel or ax. This method often results in the ice breaking unevenly below the saw cut, so that there will be a projecting lip on the bottom of one cake and a corresponding under cut or recess in the bottom of the adjacent cake. These projecting lips must be subsequently removed in order that the ice may be packed closely as is desirable in ice houses, and such removal often entails considerable labor, and the ice which is thus removed is lost and corresponding waste spaces are thus left in the ice pile.

The object of my invention is to provide a machine for making the parallel cuts or grooves in an ice field, which will facilitate the cutting operation, and reduce the expense thereof, and further will avoid the necessity of using horses, the use of which, for this sort of work, is open to many objections.

A further object is to provide a machine which will enable the ice to be cut completely through, so that all possibility of lips being formed on the under side of the ice cakes is avoided, and a still further object is to provide means for varying the force with which the saws will be fed against the ice, so that they may be worked to their full capacity and to the best advantage.

Figure 1:
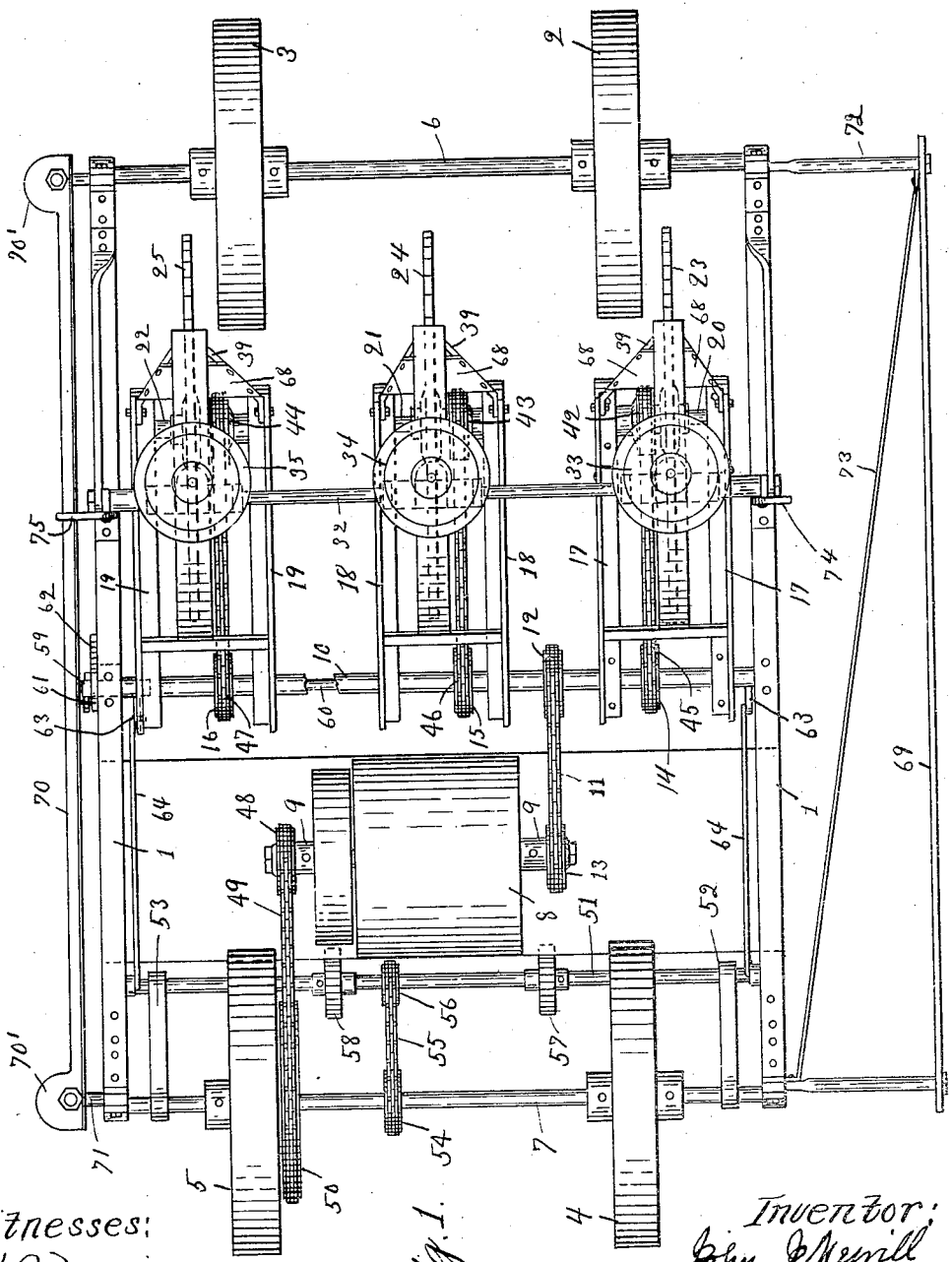
Figure 2:
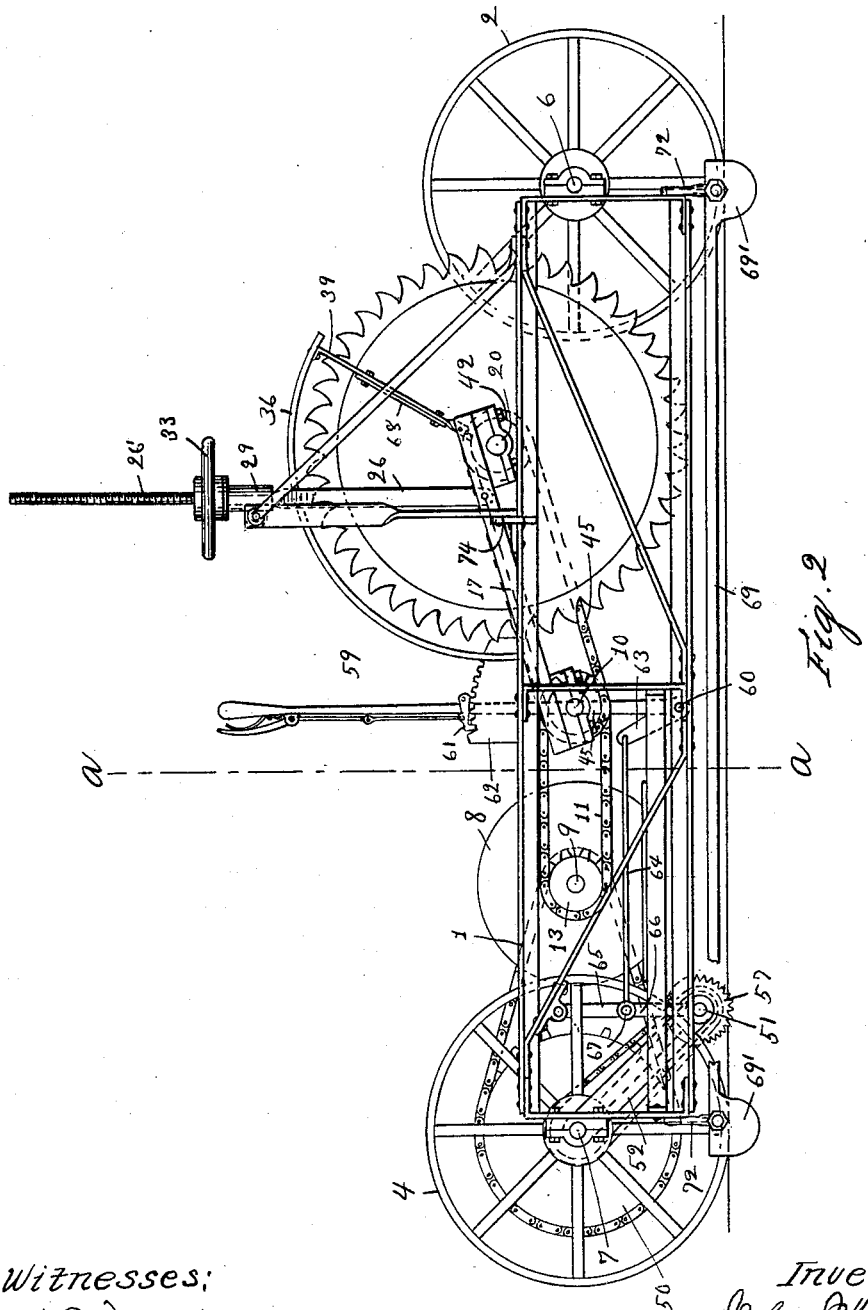
Figure 3:
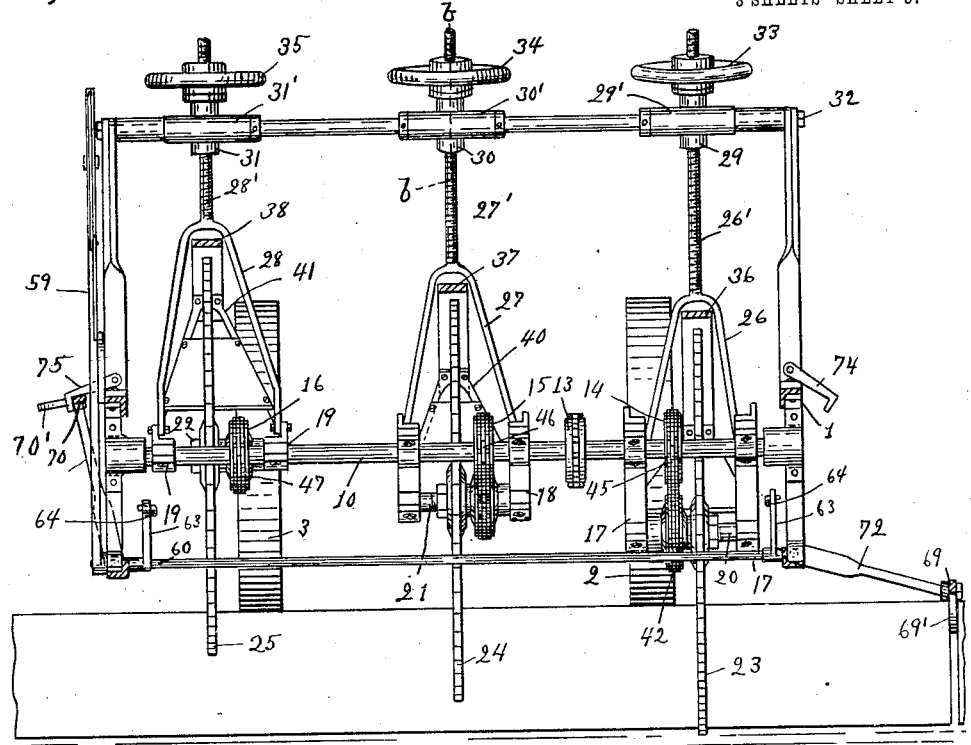
Figures 4, 5, 6:
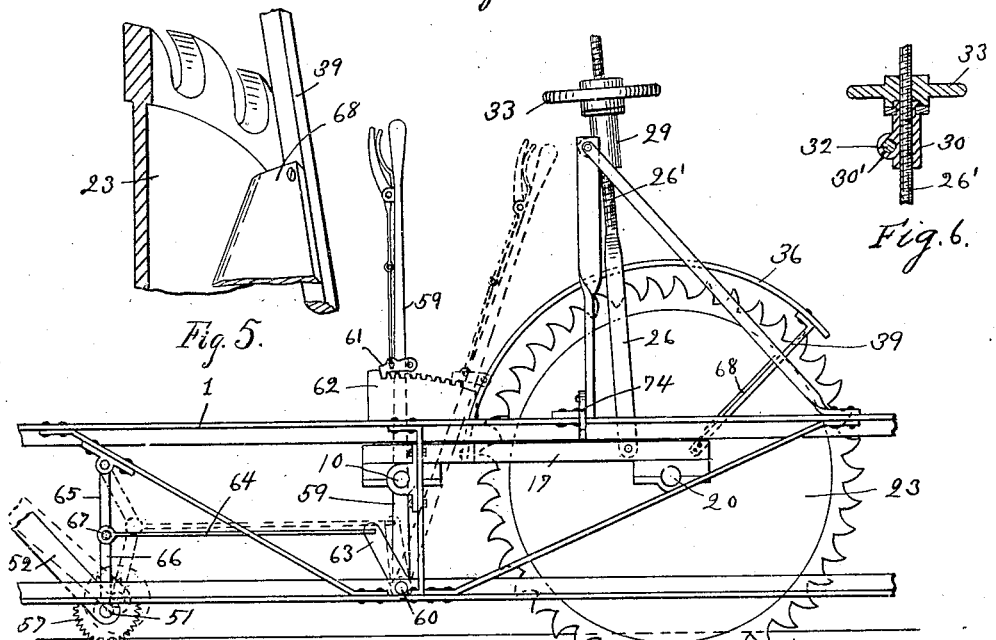

I accomplish these objects by the means shown in the accompanying drawing, in which, Figure 1 is a plan view of an ice cutting machine made according to my invention. Fig. 2 is a side elevation thereof. Fig. 3 is a cross sectional view on the line *a—a* of Fig. 2. Fig. 4 is a partial side elevation showing the parts in the position for cutting. Fig. 5 is a detail view of a portion of one of the saw scraping knives. Fig. 6 is a detail sectional view on the line *b—b* of Fig. 3.

As shown in the drawing, I provide a rectangular shaped skeleton frame 1 which is supported upon four wheels, 2, 3, 4 and 5, the rear wheels 2 and 3 being mounted upon a shaft or axle 6 which is rotatably mounted in the frame, and the front wheels 4 and 5 being rotatably mounted between collars upon a shaft 7, which is journaled in the front end of the frame. A suitably incased motor or engine 8, having a driving shaft 9, is supported upon the frame, and a counter shaft 10 extends transversely of the frame adjacent the middle thereof, is journaled therein, and is driven from the shaft 9 by means of a sprocket chain 11 which passes over a sprocket 12 thereon and over a sprocket 13 on the shaft 9. A series of sprockets 14, 15 and 16 are mounted upon the shaft 10, at suitable distances apart, and, respectively, between three pairs of arms or supports 17, 18 and 19, which are pivotally mounted at their front ends on said shaft 10, and extend rearwardly to provide supports at their rear ends for bearing boxes in which a series of shafts 20, 21 and 22 are journaled, said shafts having mounted thereon a series of circular saws 23, 24 and 25, respectively, disposed to rotate in parallel planes. As shown in the drawing the two outer saws 23 and 25 rotate in planes outside the planes of the supporting wheels 2, 3, 4 and 5. A series of yokes 26, 27 and 28 are respectively pivoted at their lower ends to the corresponding pairs of arms 17, 18 and 19, a short distance in front of the saw shafts, and said yokes are provided with screw threaded rods 26', 27' and 28' which extend respectively from the upper ends thereof and pass through brackets 29, 30 and 31 which are formed on the sides of sleeves 29', 30' and 31', said sleeves being rotatably mounted upon a shaft 32, which is supported at its extreme ends in the frame and extends transversely thereof, said sleeves being held from longitudinal movement on said shaft by suitable collars as shown. Adjusting wheels or nuts 33, 34 and 35 are respectively mounted upon the upper ends of said screws 26', 27' and 28' for raising and lowering the same, they being provided with swivel connections with the brackets 29, 30 and 31, as shown in Fig. 6, so that said screw threaded rods are held from longitudinal movement either up or down thereby, and the saws may be forced down or lifted by turning the same. Curved guards 36, 37 and 38 are respectively secured at their front ends to the several pairs of arms 17, 18 and 19 between the saws and shaft 10, and extend over said saws between the yokes 26, 27 and 28, the rear end of each guard being respectively supported by a pair of arms which extend from the rear ends of the arms 17, 18 and 19 respectively, said supporting arms being indicated by the numerals 39, 40 and 41 respectively. Sprockets 42, 43 and 44 are respectively mounted on the several saw shafts 20, 21 and 22, and chains 45, 46 and 47, respectively, pass about said sprockets and the sprockets 14, 15 and 16 on the shaft 10.

A sprocket 48 is provided on the opposite end of the shaft 9 from the sprocket 11 and a chain 49 passes about said sprocket and about a sprocket 50 on the shaft 7. A shaft 51 is rotatably mounted in the free ends of a pair of links 52 and 53 which are pivotally mounted upon the shaft 7 at opposite sides of the frame. A sprocket 54 is mounted on the shaft 7 and a chain 55 passes about said sprocket and about a sprocket 56 mounted on the shaft 51, upon which a pair of spurred or toothed wheels 57 and 58 are also mounted at suitable distances apart. An operating lever 59 is mounted on a shaft 60 journaled in the frame and is provided with a suitable pawl and ratchet mechanism 61 and 62 for holding the same in different positions of adjustment. Arms 63 are connected to said shaft 60 adjacent the ends thereof, and links 64 are respectively pivoted to arms 63 and to the joints between two pairs of toggle links 65, 66, the upper ends of which are pivoted to the frame and the lower ends of which are pivoted to the shaft 51, so that by moving said lever 59 said shaft 51 may be positively raised and lowered while it is held in its horizontal position and while it is at the same time being driven from the shaft 7.

The saws which I employ preferably have their teeth project slightly beyond the sides, as shown, and, as under some conditions there is liability of ice and snow collecting and freezing onto the sides of the saws, I provide a series of scraper knives 68 adjacent each side of each saw for removing the same, said knives being mounted on said arms 39, 40 and 41, respectively, with their edges adjacent the saws, as shown.

Guiding devices are provided at each side of the frame, comprising guiding bars 69 and 70 which are rigidly mounted at each end upon arms 71, 72, respectively, said arms being pivoted to the frame at each side thereof. Said bars are provided at each end with downwardly or transversely extended, rounded projections 69' and 70', respectively, which are adapted to enter the grooves in the ice to guide the machine. A brace-rod 73 is preferably provided for each guiding frame, said rods being respectively secured to the rear ends of said guiding bars and the inner end of the front supporting arms therefor, as shown with relation to bar 69 in Fig. 1. Hooks 74 and 75 are respectively provided at each side of the frame for holding said bars in upright position when not in use.

The operation of the device hereinbefore described is as follows:—The motor or engine, when driven, causes the circular saws 23, 24 and 25 to be rotated all at the same speed, and also causes the spur wheels 57 and 58 to be rotated forwardly. Before starting the machine the initial guiding groove will have been formed, as is customary, and one of the guiding bars 69 or 70 is dropped therein, and the saws are lowered into engagement with the ice, as indicated in Fig. 3. The operating lever 59 is then pushed forward from the dotted position of Fig. 4 until the spur wheels 57 and 58 which were raised out of contact with the ice, are pushed down into contact therewith, so that as they are rotated they will draw the whole apparatus forward. If the spur wheels are only pressed lightly into engagement with the ice there will be considerable slip therebetween, so that the apparatus will be moved slowly, and if they are pressed more forcibly into engagement therewith the speed will be increased, or the frame will be drawn forwardly with more force, so that the force with which the saws are fed against the ice may be varied according to conditions.

In opening a field of ice all of the saws may be lowered so as to cut completely through the ice in going over the field both lengthwise and crosswise, but after the field has been opened, it is more desirable to cut the grooves part way through the ice in both directions over a certain area and then, by using the outer saws alone, cut off sections, termed "floats" from the edge by lowering first one outer saw and then the other, so that they will cut completely through the ice, as the machine is run back and forth. That is, the saw next the edge will be lowered to cut completely through the ice, and, as the edge section will tend to leave the field as it is cut off, the opposite guide bar from the outer saw which is thus lowered, will be lowered to run in a previously cut groove, so that the machine will not rest, at any time, on this edge section.

With the feeding or driving mechanism which I employ there will be little or no tendency to force the machine out of a straight line, so that the friction on the guiding bar will be slight.

While a particular form of rotary cutter or circular saw has been shown, it forms no part of my invention, and various other forms of rotary cutters may possibly be more advantageously employed.

Having thus described my invention, what

I claim as new and desire to secure by Letters Patent is:—

An ice cutting machine comprising a frame having supports adapted to rest upon the ice, a series of rotary cutters mounted on said frame in parallel, composed of two end cutters disposed to engage the ice in lines outside the points of engagement of said supports with the ice and an intermediate cutter midway between said end cutters, means for independently adjusting each cutter to vary the depth of the cuts thereof and means for simultaneously rotating said cutters in their different positions of adjustment, substantially as described.

In testimony whereof, I have signed my name to this specification, in the presence of two subscribing witnesses.

JOHN J. MERRILL.

Witnesses:
L. H. HARRIMAN,
H. B. DAVIS.